(No Model.)
E. A. & M. C. MIKS.
STOCK WATERING DEVICE.
No. 324,870. Patented Aug. 25, 1885.
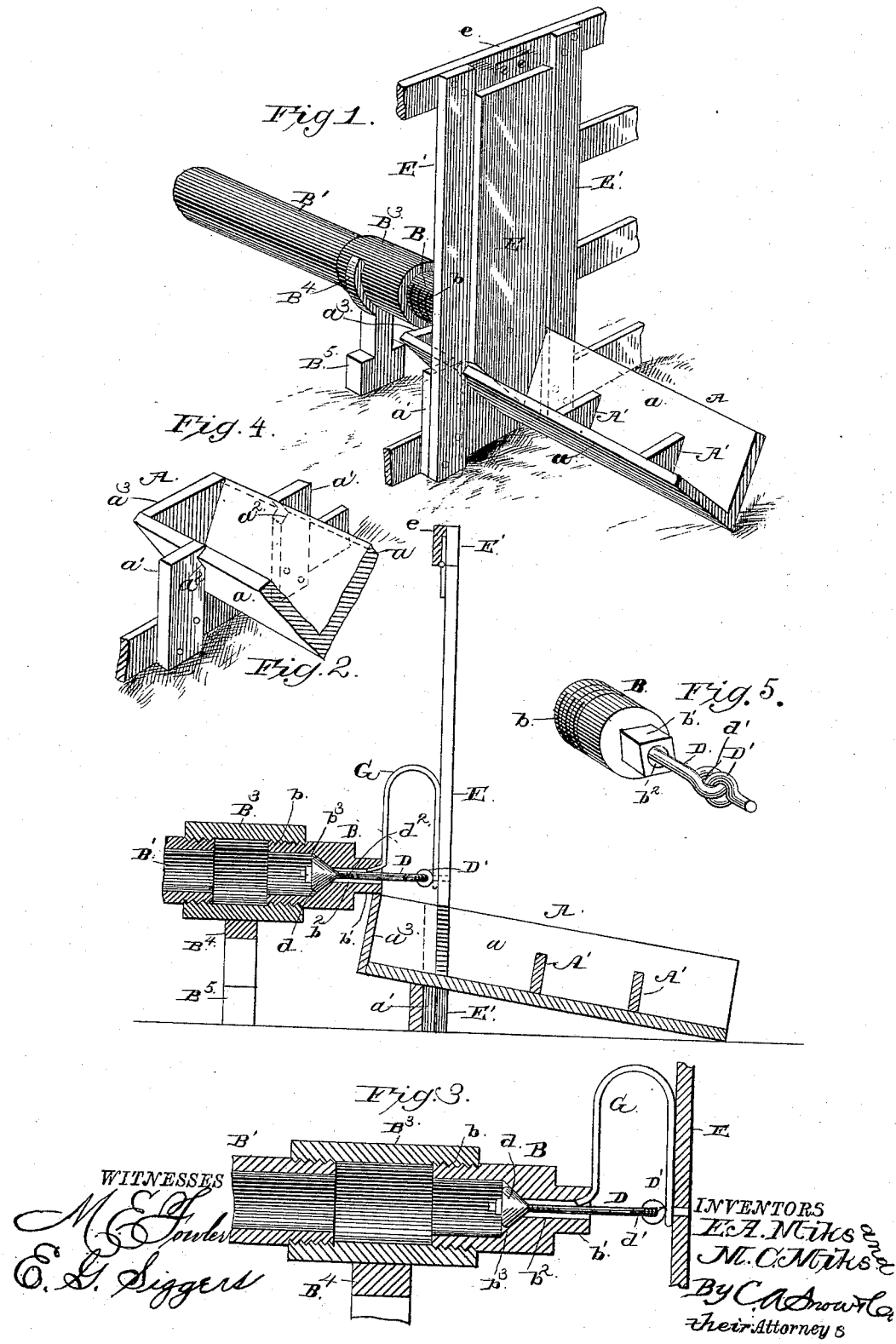

UNITED STATES PATENT OFFICE.

EMANUEL A. MIKS AND MARION C. MIKS, OF HALSTEAD, KANSAS.

STOCK-WATERING DEVICE.

SPECIFICATION forming part of Letters Patent No. 324,870, dated August 25, 1885.

Application filed July 9, 1885. (No model.)

*To all whom it may concern:*

Be it known that we, EMANUEL A. MIKS and MARION C. MIKS, citizens of the United States, residing at Halstead, in the county of Harvey and State of Kansas, have invented a new and useful Improvement in Stock-Watering Devices, of which the following is a specification, reference being had to the accompanying drawings.

Our invention relates to improvements in stock-watering devices or apparatus; and the novelty consists in the construction, combination, and arrangement of the various parts for service substantially as hereinafter fully set forth, and particularly pointed out in the claims.

The special object of our invention is to provide an apparatus of the class named which shall be capable of automatic action by pressure of the animal's nose against a pivoted or hinged movable supply-gate; and it has further for its object simplicity and durability of construction and cheapness of manufacture, all as hereinafter described.

In the drawings hereto annexed, and which form a part of this specification, Figure 1 is a perspective view of a stock-watering device embodying our invention. Fig. 2 is an elevation thereof, partly in section, and showing the connection with a tank or other water-supply; and Fig. 3 is an enlarged detail sectional view of the stop-plug and valve. Figs. 4 and 5 are detail perspective views.

Like letters of reference denote like parts in the several figures of the drawings, referring to which, A designates a trough composed of two inclined side pieces, $a\ a$, meeting each other at their lower edges and suitably secured together, said trough being V-shaped in cross-section, and is supported at its rear end by props or blocks $a'\ a'$, having notches $a^2$ cut therein to fit the inclined sides of the trough, to which they are secured by nails, screws, or otherwise. By supporting the trough in an elevated position at its rear end by means of the props $a'$ or otherwise, and permitting its front end to rest upon the ground, it is arranged in an inclined position to permit of the free escape of the water. The rear end of the trough is closed by a cross-piece, $a^3$, to prevent the escape or leakage of water falling into the trough at that end from the stop-plug B of the supply pipe or conduit B', presently described. The trough A is further provided with one or more partitions, A' A', arranged therein in a vertical position to provide two or more compartments or chambers from which the animal drinks, said partitions terminating a short distance from the upper edges of the sides of the trough to permit the water to flow over them and out the end of the trough. When a hog or other animal is drinking from the trough, its nose is immersed in the water therein, and dirt and other matter are liable to become deposited in the trough. By limiting the height of the partitions to provide a shallow water-chamber the greater part of the dirt, &c., is allowed to escape over the said partitions, thus leaving the chambers or compartments free from dirt.

B designates a plug having a cylindrical screw-threaded part, $b$, and a squared portion, $b'$, said plug being screwed into a sleeve, $B^3$, secured upon one end of the supply pipe or conduit B'. One end of the pipe B' is in communication with an elevated supply-tank or other water source, while the opposite end of said pipe B' is arranged a short distance from and above the rear elevated end of the trough A, as clearly shown. The sleeve $B^3$ is preferably screwed upon the pipe B', and receives the plug B at its opposite end; but said sleeve may be dispensed with, if desired, and the plug fitted directly in the end of the pipe B'. The pipe and sleeve may be supported by any suitable means—as, for instance, upon standards $B^5$ and curved bands or straps $B^4$.

The plug B is bored centrally in its squared portion $b'$, as at $b^2$, while the cylindrical portion $b$ thereof has a conical opening or passage, $b^3$, to provide a seat for a valve, $d$, secured upon a connecting-rod, D, passing through the passages $b^2\ b^3$ of the plug and connected at its front end to a movable supply-gate, E, hinged or pivoted at its upper end to a cross-piece, $e$, secured upon uprights or standards E' E', resting at their lower ends upon the earth and secured to the supporting-blocks or props $a'\ a'$ by nails, &c.

The rod D is bent at its front end to provide an eye, $d'$, which connects with a staple, D', secured to the gate E near the lower end thereof, the rear end of said rod being screw-threaded, as at $d^2$, and the valve $d$ screwed thereon.

The valve is conical in form and fits snugly against the inner surface of the opening in the plug B, which forms a seat therefor. The valve may be made of metal and have a leather disk or face, or it may be of leather alone, and by its position upon the rod D it determines the length of play of the gate E, and, consequently, the quantity of water admitted to the trough. If the valve is screwed upon the rod D too near its front end the rod and gate have a limited play and but a small stream of water is permitted to flow from the supply-pipe to the trough; but when the valve occupies a position near the rear end of the rod D the said rod and gate have a greater range of movement and a large, full stream of water escapes. It will thus be seen that the supply of water can be regulated to suit the demands of the stock, the valve being readily accessible for this purpose or for repairs, &c., by simply unscrewing the sleeve $B^3$ from the pipe B' and fitting a plug or stopper therein to prevent the escape of the water while manipulating the valve. The valve may also be regulated by turning the rod D, it being first disconnected from the gate.

The lower end of the gate E is beveled or cut away at each side to snugly and closely fit against the sides and bottom of the trough, it being capable of free movement therein when pressure is brought to bear against the same by the animal forcing its nose against the lower end thereof, which movement causes the connecting-rod D to move backward and displaces the valve from its seat, thus allowing the water to escape from the supply-pipe into the trough.

The gate is automatically returned to its normal position in the trough when pressure thereon is released by a spring, G. We would have it understood that we do not limit ourselves to any particular form of spring or to the location thereof for automatically returning the gate to its normal closed position in the trough. The spring herein shown is of U form, having one of its ends connected to the staple D', while its other end bears against the plug B, said end being preferably bent and fitting in the opening $b^2$ thereof.

In lieu of the supporting-blocks or props $a'$ for the trough, it may be supported by means of the uprights E', in which case said uprights are planted in the ground at each side of the trough and are provided with notches on their inner adjacent surfaces at a proper height, within which the upper edges of the trough fit and are secured.

The operation of our invention is as follows: When pressure, either from the animal's nose or hand of an operator, is brought to bear against the lower end of the gate E, it is forced backward, causing the rod D to move in the same direction, and displacing the valve thereon from its seat, thus permitting of the passage of the water from the supply-pipe B' through the sleeve $B^3$ and passages $b^2$ $b^3$ in the plug B into the trough. When pressure is removed from the gate, the spring G or its equivalent automatically brings the gate back to its normal closed position, thus shutting off the water-supply by moving the connecting-rod D and its valve to their closed positions.

What we claim as new, and desire to secure by Letters Patent, is—

1. In a stock-watering apparatus, the trough, in combination with a water-supply pipe communicating with the trough, a regulating-valve fitted in the supply-pipe, and a pivoted supply-gate fitted within the trough so as to be actuated by the nose of the animal, and connected to the valve, whereby the pressing of the gate backward causes the opening of the valve, and means, substantially as described, for returning the gate to its closed position, as set forth.

2. In a stock-watering apparatus, the trough, in combination with a water-supply pipe arranged on the same plane, and communicating with the trough, a horizontal regulating-valve fitted in the supply-pipe, and a vertical pivoted supply-gate connected with the stem of the valve and fitting within the trough, the pressing of the gate backward causing the valve to work on a horizontal line, as set forth.

3. In a stock-watering apparatus, the combination of a trough, a supply-pipe, a pivoted supply-gate, a regulating-valve fitted in the supply-pipe and connected to the gate, and a spring for returning the gate to its closed position when pressure thereon is removed, substantially as described.

4. In a stock-watering apparatus, the combination of an inclined trough, a supply-pipe, a pivoted supply-gate supported by uprights, a plug having openings or passages therein fitted in the supply-pipe, a valve-rod connected to the gate and carrying a valve fitting in the plug, and a spring for automatically returning the gate to its closed position, substantially as described.

5. In a stock-watering apparatus, the combination of a trough having upright partitions, a supply-pipe, a pivoted spring-actuated supply-gate, a plug fitted in the supply-pipe and having a valve-seat therein, and a rod carrying a valve controlled by the supply-gate, substantially as described.

6. In a stock-watering apparatus, the combination, with a trough and a supply-pipe, of a spring-actuated pivoted gate, a plug having an exterior screw-threaded portion fitting in the supply-pipe and having a valve-seat, and a valve-rod having a valve adapted to fit said seat and pivotally connected to said gate, substantially as described.

7. In a stock-watering apparatus, the combination of an inclined trough having partitions therein terminating a short distance from the upper edges thereof, and adapted to form drinking-chambers, a supply-pipe, a pivoted spring-actuated gate, a plug fitted in the supply-pipe, and a regulating valve and rod controlled by the supply-gate, substantially as described.

8. In a stock-watering apparatus, the combination of the following elements: a trough, A, supported in an inclined position, and having partitions A' therein to provide drinking-compartments, a supply-pipe, B', a sleeve, B³, secured thereon, a plug, B, fitted in said pipe and having a valve-seat and opening formed therein, a screw-threaded valve-rod, D, carrying a valve, d, and pivotally connected to a supply-gate, a supply-gate, E, pivoted to a horizontal cross-bar, e, standards E', to which said cross-bar is secured, and a spring, G, connected to the supply-gate and adapted to bear against the plug B, all arranged and adapted to operate substantially as set forth.

In testimony that we claim the foregoing as our own we have hereto affixed our signatures in presence of two witnesses.

EMANUEL A. MIKS.
MARION C. MIKS.

Witnesses:
W. M. MUNCH,
S. H. TREGO.